(12) United States Patent
Margomenos

(10) Patent No.: US 7,817,097 B2
(45) Date of Patent: Oct. 19, 2010

(54) MICROWAVE ANTENNA AND METHOD FOR MAKING SAME

(75) Inventor: Alexandros Margomenos, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 271 days.

(21) Appl. No.: 12/098,663

(22) Filed: Apr. 7, 2008

(65) Prior Publication Data

US 2009/0251375 A1  Oct. 8, 2009

(51) Int. Cl.
*H01Q 13/02* (2006.01)

(52) U.S. Cl. ........................ 343/786; 343/772

(58) Field of Classification Search .......... 343/786, 343/772, 771
See application file for complete search history.

(56) References Cited

U.S. PATENT DOCUMENTS

| | | | |
|---|---|---|---|
| 2,867,778 A * | 1/1959 | Hafner | 333/33 |
| 4,527,165 A | 7/1985 | de Ronde et al. | |
| 4,571,593 A * | 2/1986 | Martinson | 343/783 |
| 4,888,597 A | 12/1989 | Rebiez et al. | |
| 5,495,262 A | 2/1996 | Klebe | |
| 5,886,671 A | 3/1999 | Riemer et al. | |
| 6,147,660 A | 11/2000 | Elliott et al. | |
| 6,323,818 B1 | 11/2001 | Koh et al. | |
| 6,404,402 B1 | 6/2002 | Koh et al. | |
| 6,597,322 B2 * | 7/2003 | Takenoshita | 343/771 |
| 7,113,140 B2 * | 9/2006 | Nagano | 343/786 |
| 7,239,219 B2 | 7/2007 | Brown et al. | |

* cited by examiner

*Primary Examiner*—Tho G Phan
(74) *Attorney, Agent, or Firm*—Gifford, Krass, Sprinkle, Anderson & Citkowski, P.C.

(57) ABSTRACT

A method for fabricating a microwave horn antenna in which a thermoplastic sacrificial layer is mounted to a thermoplastic horn layer. A heated horn embossing plate having at least one horn shaped embossing element is then moved into the horn layer so that the horn element penetrates through the horn layer and extends partially into the sacrificial layer thus forming a horn opening in the horn layer complementary in shape to the horn element. The horn layer and sacrificial layer are then separated from each other and the horn opening and at least a portion of the back surface of the horn layer is covered with a metal coating. A thermoplastic wave guide layer formed by embossing wave guide channels into the layer is covered with metal and attached to the back side of the horn layer to form the antenna. Alternatively, a portion of the horn and the remaining portion of a microwave channel are formed in both a first and second thermoplastic section. These portions of the microwave guide channel and horn are then coated with a metal material and the sections are secured together in a facing relationship so that the horn portions and wave guide channel portions on both the first and second sections register with each other.

8 Claims, 2 Drawing Sheets

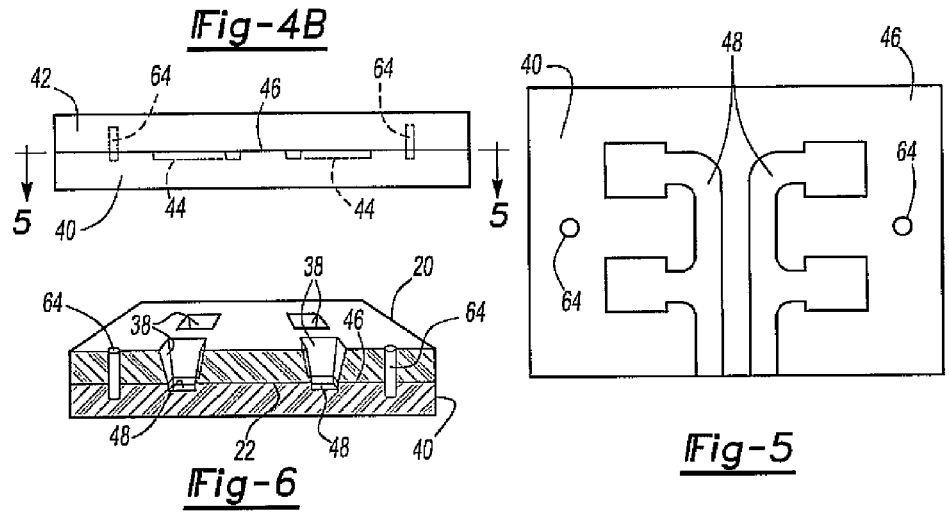
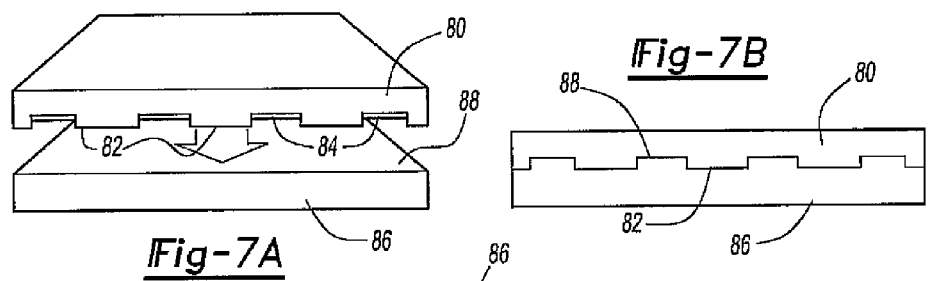
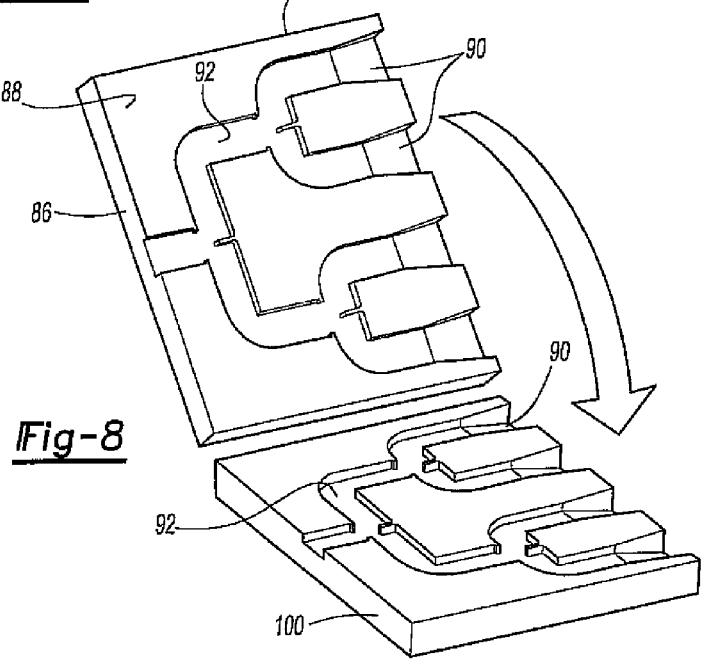

MICROWAVE ANTENNA AND METHOD FOR MAKING SAME

BACKGROUND OF THE INVENTION

I. Field of the Invention

The present invention relates generally to a microwave antenna and method for making the microwave antenna.

II. Description of Related Art

Dedicated short range radar communications (DSRC) of the type used in automotive vehicles occur at high microwave frequencies, currently about 77 gigahertz. Such DSRC systems are utilized not only for anti-collision systems, but also as well as other inter-vehicle and vehicle infrastructure communications. These previously known DSRC systems typically use microwave antenna arrays with a plurality of spaced apart horns for additional gain. Furthermore, since such antennas are utilized in automotive vehicles, a low cost antenna system is highly desirable.

One previously known method for constructing microwave horn antennas of the type used in automotive vehicles has been to place a layer of thermoplastic material in between two hot embossing plates so that one plate faces a front surface of the layer while a second plate faces the back side of the layer.

The first plate includes one or more horn shaped embossing elements while, similarly, the second embossing plate contains embossing elements corresponding in shape to the wave guide channels for the antenna. The embossing plates, when heated, are then compressed against the thermoplastic layer so that the horn shaped embossing elements penetrate the thermoplastic layer and ultimately abut against the second embossing plate. Similarly, the wave guide channel elements on the second embossing plate depress portions of the back side of the thermoplastic layer to form the wave guide channels so that the wave guide channels are interconnected with the one or more cones.

Thereafter, both the front and back sides of the wave guide are covered with metal by sputtering a metal both onto the cones as well as the wave guide channels. A metal plate is then positioned across the back side of the thermoplastic layer so that the wave guide channels are formed in between the metal plate and the metallized wave guide channels on the back side of the thermoplastic layer. The horn and wave guide channels are then further metal coated by electroplating.

A primary disadvantage of this previously known method of fabricating microwave horn antennas, however, is that a certain amount of plastic flash is formed at the intersection of the horn embossing element and the second embossing plate during the embossing process. Such plastic flash is not only difficult to metallize as required for proper antenna performance, but also interferes with the overall operation of the microwave antenna since the flash changes the ideal shape of the cone for optimal microwave performance.

In order to avoid degradation of antenna performance caused by the plastic flash, it has been the previous practice to remove the flash either with a knife or similar object prior to covering the horn with the metal coating. The removal of flash in this fashion, however, is imprecise and thus results in overall degradation of the performance for the antenna. Furthermore, this removal cannot be automated and requires manual handling, both of which increase the manufacturing cost.

SUMMARY OF THE PRESENT INVENTION

The present invention provides a method for fabricating a microwave horn antenna which overcomes the above-mentioned disadvantages of the previously known methods.

In a first embodiment of the invention, a sacrificial layer of thermoplastic material is first mounted to the horn layer of thermoplastic material. The horn layer includes both a front and back spaced apart surfaces and the sacrificial layer flatly abuts against at least a portion of the back surface of the horn layer.

A heated embossing plate having at least one horn shaped embossing element is then moved against the front surface of the horn layer so that the horn element on the embossing plate penetrates through the horn layer and extends partially into the sacrificial layer. In doing so, the embossing element forms the horn opening in the horn layer which is complementary in shape to the horn element on the embossing plate.

The horn layer and sacrificial layer are then separated from each other. The horn opening and at least a portion of the back surface of the horn opening is then covered with a metal coating, preferably by sputtering.

In order to complete the microwave antenna, a wave guide layer of thermoplastic material defining at least one wave guide channel is fabricated to cover the back side of the horn layer. Preferably, the wave guide layer is formed by moving a heated wave guide embossing plate having at least one wave guide shaped embossing element against the front surface of the wave guide layer. In doing so, the embossing plate extends at least partially into the wave guide layer thus forming the wave guide channels. These channels are then covered with a metal material, such as by sputtering.

The wave guide layer and horn layer are then attached to each other. The metallization of the wave guide channels and horns is then completed by electroplating.

Since the horns are formed by pressing the horn embossing element completely through the horn layer and partially into the sacrificial layer, all plastic flash at the signal input end of the wave guide horn is completely eliminated. In doing so, the inlet end of the horn may be precision formed which enhances the overall efficiency and accuracy of the microwave antenna.

In a second embodiment of the invention, at least a portion of the horn and at least a portion of the microwave guide channel associated with the first horn is formed in a first thermoplastic section having a planar surface. Preferably, the portions of the horn and microwave channel are formed by pressing a hot embossing plate into the thermoplastic section.

Similarly, the remaining portion of the horn and remaining portion of the microwave guide channel associated with the horn is formed in a second thermoplastic section having a planar surface. These portions of the horn and microwave guide channel are also preferably formed by pressing a hot embossing tool into the planar surface of the second thermoplastic section. Preferably, the first and second sections are identical to each other.

Following the fabrication of both the first and second sections, the portions of the horn and microwave guide channels on both the first and second sections are covered with metal. Although various methods may be used to achieve this, preferably, the horn portions and microwave guide portions are covered with metal by sputtering.

After metallization of the horn and microwave guide channel portions, the first and second sections are secured together in a facing relationship so that the planar surfaces of the first and second sections flatly abut against each other and so that the horn portions on both sections and wave guide portions on both sections register with each other. Following attachment of the sections, the metallization of the antenna is completed preferably through electroplating.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIGS. 4A and 4B are diagrammatic steps illustrating the fabrication of the wave guide layer according to the present invention;

FIG. 5 is a view taken substantially along line 5-5 in FIG. 4B;

FIG. 6 is a diagrammatic view illustrating the microwave antenna of the present invention;

FIGS. 7A and 7B are a diagrammatic view illustrating the initial steps of fabricating a preferred second embodiment of the present invention; and FIG. 8 is an elevational diagrammatic view illustrating the assembly of the second embodiment of the present invention.

DETAILED DESCRIPTION OF PREFERRED EMBODIMENTS OF THE PRESENT INVENTION

Figure 1:
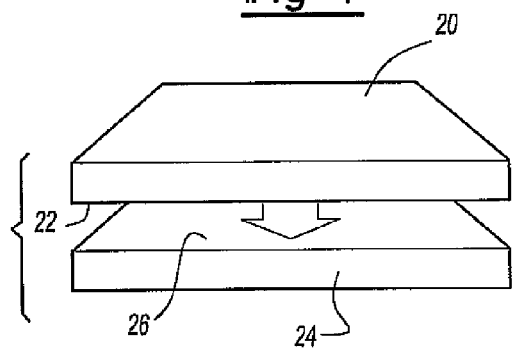
FIG. 1 is an elevational diagrammatic view illustrating an initial step of fabricating the microwave antenna according to a first embodiment of the present invention.
Figure 2:
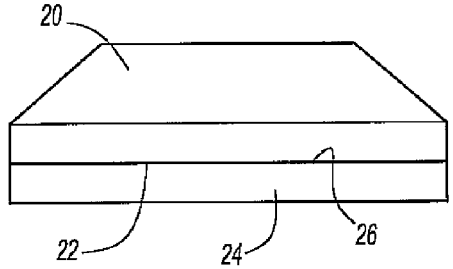
FIG. 2 is an end view illustrating a step of the fabrication of the microwave antenna according to the present invention.

With reference now to FIGS. 1 and 2, in order to form the microwave horn antenna according to the present invention, a horn layer 20 of thermoplastic material is provided. This thermoplastic layer 20 includes a planar surface 22 and has a thickness at least equal to the axial length of the horn for the microwave antenna. Similarly, a sacrificial layer 24 of thermoplastic material is also provided. The sacrificial layer 24 includes a front planar surface 26 which flatly abuts against the back planar surface 22 of the horn layer 20.

The horn layer 20 and sacrificial layer 24 are mounted together as shown in FIG. 2 so that the surfaces 22 and 26 flatly abut against each other. Any conventional means, such as a mechanical jig, adhesive or the like may be utilized to temporarily secure the horn layer 20 and sacrificial layer 24 together.

Figure 3A:
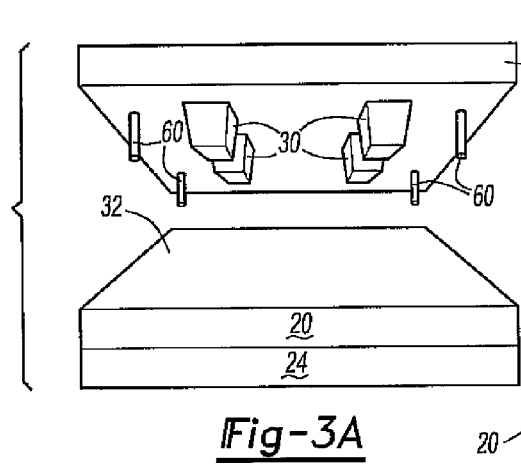
FIGS. 3A-3C are diagrammatic views illustrating the step of embossing the horn openings in the horn layer.
Figure 3B:
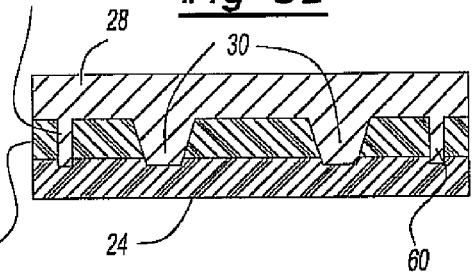
Figure 3C:
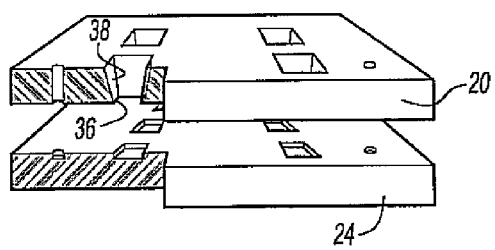

With reference now to FIGS. 3A-3C, a heated embossing plate 28 having at least one, and more typically several, horn shaped embossing elements 30 is positioned above the front surface 32 of the horn layer 20. The embossing plate 28, when heated, is moved from the position shown in FIG. 3A and to the position shown in FIG. 3B. In doing so, the horn shaped embossing elements 30 penetrate the horn layer 20. Furthermore, the horn shaped embossing elements 30 are dimensioned so that, upon completion of the embossing operation as illustrated in FIG. 3B, the embossing elements 30 not only penetrate through the horn layer 20, but extend slightly into the sacrificial layer 24. The embossing tool 28 is then removed as shown in FIG. 3 thus leaving the plurality of horn shaped openings 34 in the horn layer 20.

As best shown in FIG. 3, since the horn shaped embossing elements 30 penetrate completely through the horn layer 20 and partially into the sacrificial layer 24 all plastic flash around a signal inlet end 36 of each horn opening 38 is completely avoided. Instead, the single inlet end 36 of each horn opening 38 maintains the precise dimensional size as defined by the embossing tool and its horn shaped elements 30.

Following the embossing step, the sacrificial layer 24 is separated from the horn layer 20 as shown in FIG. 3C. The sacrificial layer 24 is then either discarded or recycled. Furthermore, in order to facilitate the separation of the sacrificial layer 24 from the horn layer 20 following the embossing operation, it is preferable that the horn layer 20 and sacrificial layer 24 be made of thermoplastic materials that do not readily bond together.

Figure 4A:
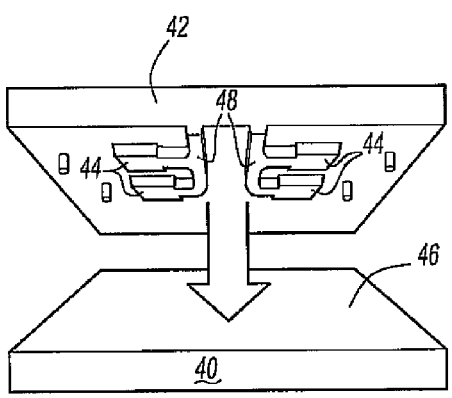

After construction of the horn layer 20 with the horn openings 38, a wave guide layer 40, also constructed of a thermoplastic material, is fabricated to form the wave guide channels for coupling the microwave energy to the horn openings 38. As best shown in FIG. 4A, a heated embossing plate 42 is provided having one or more outwardly protruding wave guide embossing elements 44. These wave guide embossing elements 44 correspond in shape to the desired wave guide channels for the antenna.

The heated embossing plate 42 is moved from the position illustrated in FIG. 4A and to the position illustrated in FIG. 4B in which the wave guide embossing elements 44 contact and partially penetrate a front surface 46 of the wave guide layer 40. The wave guide channel embossing tool 42 is then removed.

As best shown in FIG. 5, after the removal of the wave guide embossing plate 42, the embossing plate 42 effectively forms wave guide channels 48 in the front surface 46 of the wave guide layer 40. It will be understood, of course, that the wave guide channels 48 illustrated in FIG. 5 are by way of illustration only and that the precise shape and size of the wave guide channels 48 varies dramatically depending upon the design of the overall antenna.

After formation of both the horn layer 20 and wave guide layer 40 by their respective embossing plates 28 and 42, the wave guide channels 48 and the horns 38 are coated or covered by a metal preferably by sputtering although different methods may be utilized. At least a portion of the back surface of the horn layer 20 is also preferably covered with a metal material by sputtering or other conventional methods.

With reference now to FIG. 6, the front side 46 of the wave guide channel layer 40 is then mounted flatly against the rear side 22 of the horn layer 20 so that each horn opening 38 registers with its associated wave guide channel 48. The horn layer 20 and wave guide layer 40 are then secured together by any appropriate means such as an adhesive, mechanical fasteners, chemical bonding, and/or the like.

In order to facilitate the proper alignment between the horn layer 20 and the wave guide layer 40, preferably one or more alignment rods 60 (FIG. 3B) protrude outwardly from the embossing plate 28 and form openings in the horn layer 20 at precise known positions. The openings formed by the alignment rods 60 in the horn layer 20 in turn cooperate with alignment rods 64 (FIGS. 4B and 5) formed on the wave guide layer 40 during the embossing step forming the wave guide layer.

After the horn layer 20 and wave guide layer 40 are secured together as shown in FIG. 6, the wave guide channels 48 and horns 38 are preferably electroplated to complete the metallization of the microwave antenna.

From the foregoing, it can be seen that the present invention provides a simple and yet highly effective means to fabricate a microwave antenna which completely eliminates the plastic flash formed around the signal in the ends 38 of the microwave horns as present with the previously known antenna constructions.

With reference now to FIGS. 7A and 7B, a modification to the present invention is shown in which a heated embossing plate 80 having an embossing pattern 82 on its bottom side 84 is positioned above a section 86 of thermoplastic material. The embossing plate 80 is then moved into the section 86 as shown in FIG. 7B such that the embossing pattern is formed in an upper surface 88 of the section 86.

As best shown in FIG. 8, the embossing pattern 82 on the embossing plate 80 creates a portion of the microwave horns 90 as well as a portion of the microwave guide channels 92 associated with the horns 90 in the planar upper surface 88 of the first section 86. It will be understood, of course, that the pattern illustrated in FIG. 8 is by way of illustration only.

Still referring to FIG. 8, a second section 100 is also formed in substantially the identical fashion as the first section 86. Therefore, a further description thereof is unnecessary. Additionally, preferably the first section 86 and second section 100 are substantially identical to each other.

After the fabrication of both the first section 86 and second section 100, at least the horn portions 90 and wave guide channel portions 92 are initially metallized by any conventional means such as sputtering. Other metallization means, of course, may be used without deviation from the spirit or scope of the invention.

The first section 86 and second section 100 are then positioned in a facing relationship so that the horn portions 90 on the first section 86 register with the corresponding horn portions 90 on the second section 100. Likewise, the microwave guide channel portions 92 on the first section 86 also register with the microwave guide channel portions on the second section 100. The first and second sections 86 and 100 are then secured together by any conventional means.

After securing the first section 86 to the second section 100, the metallization of the guide channels 92 and horns 90 is completed by electroplating the horns 90 and guide channels 92. Thereafter multiple blocks of the first section 86 and second section 100 may be assembled together to form the microwave antenna with the desired number of horns and thus the desired gain and directivity of the antenna.

Since the embossing plate 80 used to imprint the embossed pattern of both the partial horns 90 and partial wave guide channels 92 in the first and second sections 86 and 100 does so without leaving any plastic flash, distortion and attenuation of the microwave signal caused by such plastic flash is completely avoided. Furthermore, since the entire microwave channel is formed of a plastic material other than, of course, the metallization step, the present invention effectively avoids the previously employed metal plate together with the attendant cost and weight associated with such metal plates for microwave antennas.

Having described my invention, many modifications thereto will become apparent to those skilled in the art to which it pertains without deviation from the spirit of the invention as defined by the scope of the appended claims.

I claim:

1. A method for fabricating a microwave horn antenna comprising the steps of
mounting a sacrificial layer of thermoplastic material to a horn layer of thermoplastic material, said horn layer having a front and back spaced apart surface, so that one side of said sacrificial layer flatly abuts against at least a portion of said back surface of said horn layer,
moving a heated horn embossing plate having at least one horn shaped embossing element against said front surface of said horn layer so that said horn element penetrates said horn layer and extends partially into said sacrificial layer thus forming a horn opening in said horn layer complementary in shape to said horn element,
thereafter separating said horn layer and said sacrificial layer,
covering said horn opening with a metal coating,
fabricating a wave guide layer,
attaching said wave guide layer to said back side of said horn layer.

2. The method as defined in claim 1 wherein said covering step further comprises the step of
sputtering a metal on said horn opening and at least a portion of the back surface of the horn layer.

3. The method as defined in claim 2 wherein said covering step further comprises the step of
electroplating a metal on said horn opening and at least a portion of the back surface of the horn layer after said sputtering step.

4. The method as defined in claim 1 wherein said wave guide layer fabricating step comprises the steps of
moving a heated wave guide embossing plate having at least one wave guide shaped embossing element against a front surface of a wave guide layer of thermoplastic material so that said wave guide shaped embossing element extends partially into said wave guide layer thus forming wave guide channels in said front surface of said wave guide layer, and
covering said wave guide channels with a metal coating.

5. The method as defined in claim 4 wherein said covering step further comprises the step of
sputtering a metal on said wave guide channels.

6. The method as defined in claim 5 wherein said covering step further comprises the step of
electroplating a metal on said wave guide channels after said sputtering step.

7. The method as defined in claim 4 wherein said wave guide embossing plate includes at least one cavity which forms an alignment post on said wave guide layer following said moving step, said post being received in an alignment opening in said horn layer during said attaching step.

8. A microwave horn antenna comprising
a thermoplastic horn layer having a front and a back spaced apart surfaces and at least one horn opening which extends between and through said front and back surfaces, said horn opening being formed by mounting a thermoplastic sacrificial layer to said back of said horn layer, moving a heated embossing plate having a horn shaped embossing element against said horn layer so that said horn shaped embossing element penetrates through said horn layer and extends partially into said sacrificial layer and thereafter separating said sacrificial layer from said horn layer,
a wave guide layer having a front surface with at least one wave guide channel,
said horn and said wave guide channels each having a metal coating,
said front surface of said wave guide layer being mounted against said back surface of said horn layer so that said wave guide channel registers with said horn opening.

* * * * *